(12) United States Patent
Ogawa et al.

(10) Patent No.: US 7,123,377 B2
(45) Date of Patent: Oct. 17, 2006

(54) SYSTEM FOR MANAGING NUMBER OF SHEETS FOR IMAGE FORMATION

(75) Inventors: Mutsuo Ogawa, Atsugi (JP); Matsuo Yomogida, Shibata-gun (JP); Takamitsu Abe, Iwanuma (JP); Hideaki Matsuda, Natori (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 10/914,089

(22) Filed: Aug. 10, 2004

(65) Prior Publication Data
US 2005/0007630 A1   Jan. 13, 2005

Related U.S. Application Data

(63) Continuation of application No. 09/531,522, filed on Mar. 21, 2000, now Pat. No. 6,819,446.

(30) Foreign Application Priority Data

Apr. 13, 1999   (JP)   .................................. 11-105013
Apr. 21, 1999   (JP)   .................................. 11-113089

(51) Int. Cl.
G06F 15/00   (2006.01)

(52) U.S. Cl. ................................... 358/1.15

(58) Field of Classification Search .............. 358/1.1, 358/1.9, 1.13, 1.14, 1.15, 435, 436, 448; 399/79, 80; 705/52; 707/205; 713/168; 340/568.1
See application file for complete search history.

(56) References Cited

U.S. PATENT DOCUMENTS 5,027,153 A     6/1991   Komiya ..................... 358/1.18

(Continued)

FOREIGN PATENT DOCUMENTS

JP             3-52626        8/1991

(Continued)

OTHER PUBLICATIONS

Patent Abstracts of Japan, JP 10-261164, Sep. 29, 1998.

(Continued)

*Primary Examiner*—Gabirel Garcia
(74) *Attorney, Agent, or Firm*—Oblon, Spivak, McClelland, Maier & Neustadt, P.C.

(57)   ABSTRACT

When a holder of an ID card approaches an image formation instructing device for sending an image forming instruction to an image forming apparatus, an ID code stored in a RF-ID element built in the ID card is read by a RF communication device. When the image formation instructing device transmits an image forming instruction to the image forming apparatus in this condition, an image forming operation is executed and the number of sheets for image formation is counted by counting means. Further, the counted number of sheets for image formation is associated with an ID code having predetermined bearing on the personal ID code read by the RF communication device and thereafter stored and held in a number-of-sheets file. Thus, the number of sheets for image formation is managed without preparing a key counter, a key card, etc. and without special operation.

12 Claims, 10 Drawing Sheets

U.S. PATENT DOCUMENTS

| | | | |
|---|---|---|---|
| 5,027,288 A | 6/1991 | Suzuki et al. | 358/1.18 |
| 5,159,324 A | 10/1992 | Ohtani et al. | 715/827 |
| 5,251,044 A | 10/1993 | Ikegaya | 358/440 |
| 5,260,742 A | 11/1993 | Kikkawa | 399/83 |
| 5,629,981 A | 5/1997 | Nerlikar | 713/168 |
| 5,959,530 A | 9/1999 | Lupien, Jr. et al. | 340/568.1 |
| 6,052,547 A | 4/2000 | Cuzzo et al. | 399/79 |
| 6,529,918 B1 | 3/2003 | Takahashi | 707/205 |

FOREIGN PATENT DOCUMENTS

| | | |
|---|---|---|
| JP | 7-234896 | 9/1995 |
| JP | 10-273208 | 10/1998 |

OTHER PUBLICATIONS

Patent Abtracts of Japan, JP 02-183068, Jul. 17, 1990.
Patent Abstracts of Japan, JP 09-270011, Oct. 14, 1997.

Fig.6

| POST CODE 20a | NUMBER OF SHEETS TO BE COPIED 20b | NUMBER OF SHEETS TO BE PRINTED 20c | AMOUNT FOR COPY 20d | AMOUNT FOR PRINT 20e | TOTAL AMOUNT 20f |
|---|---|---|---|---|---|
| -------- | -------- | -------- | -------- | -------- | -------- |

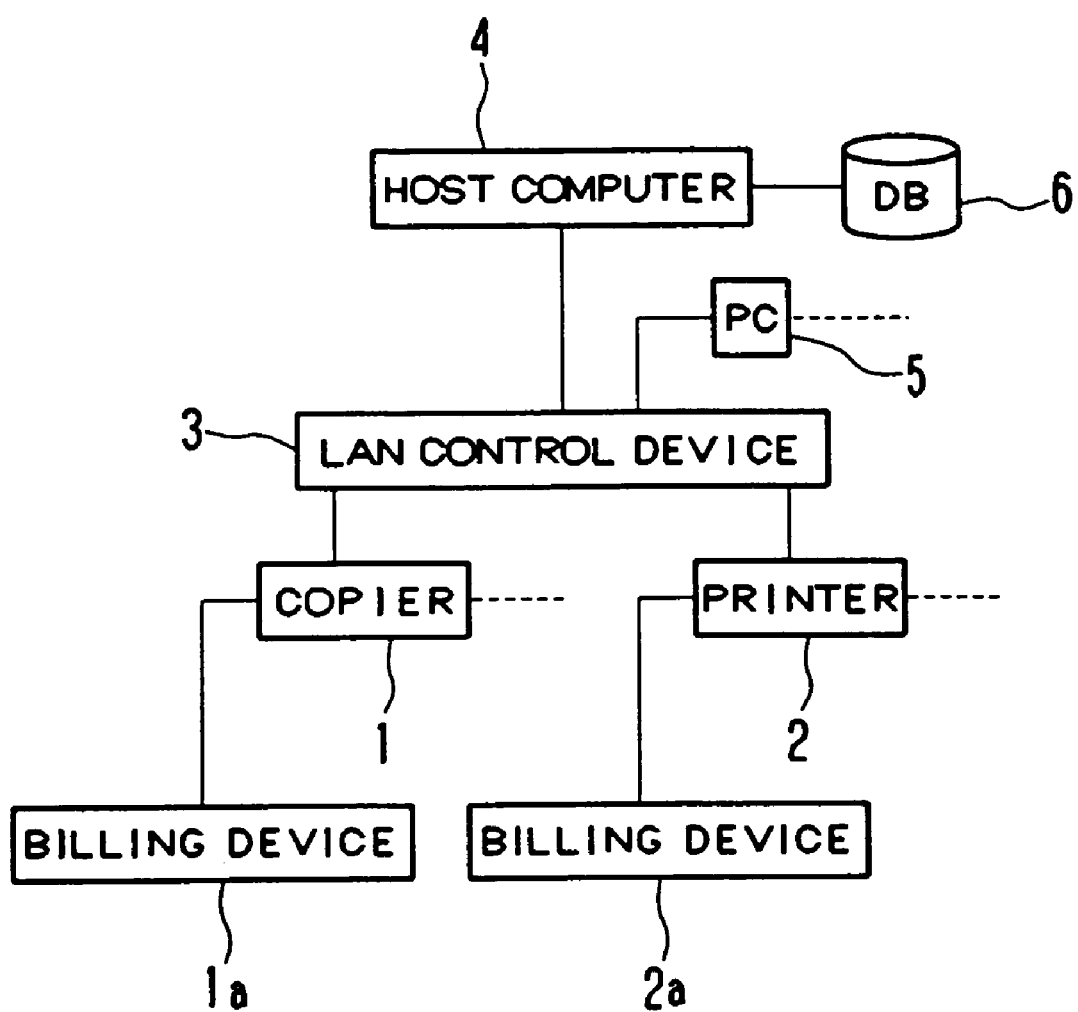

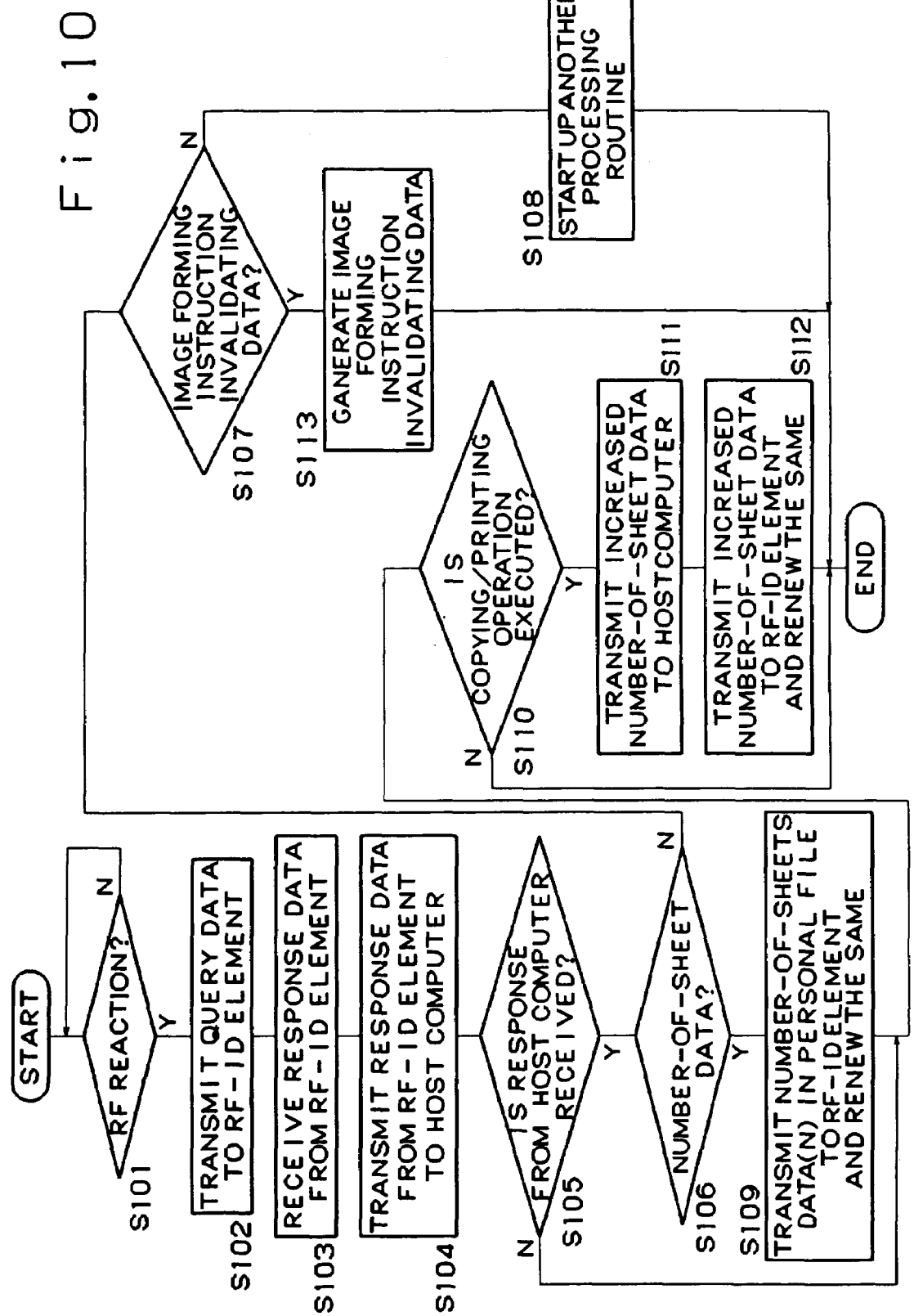

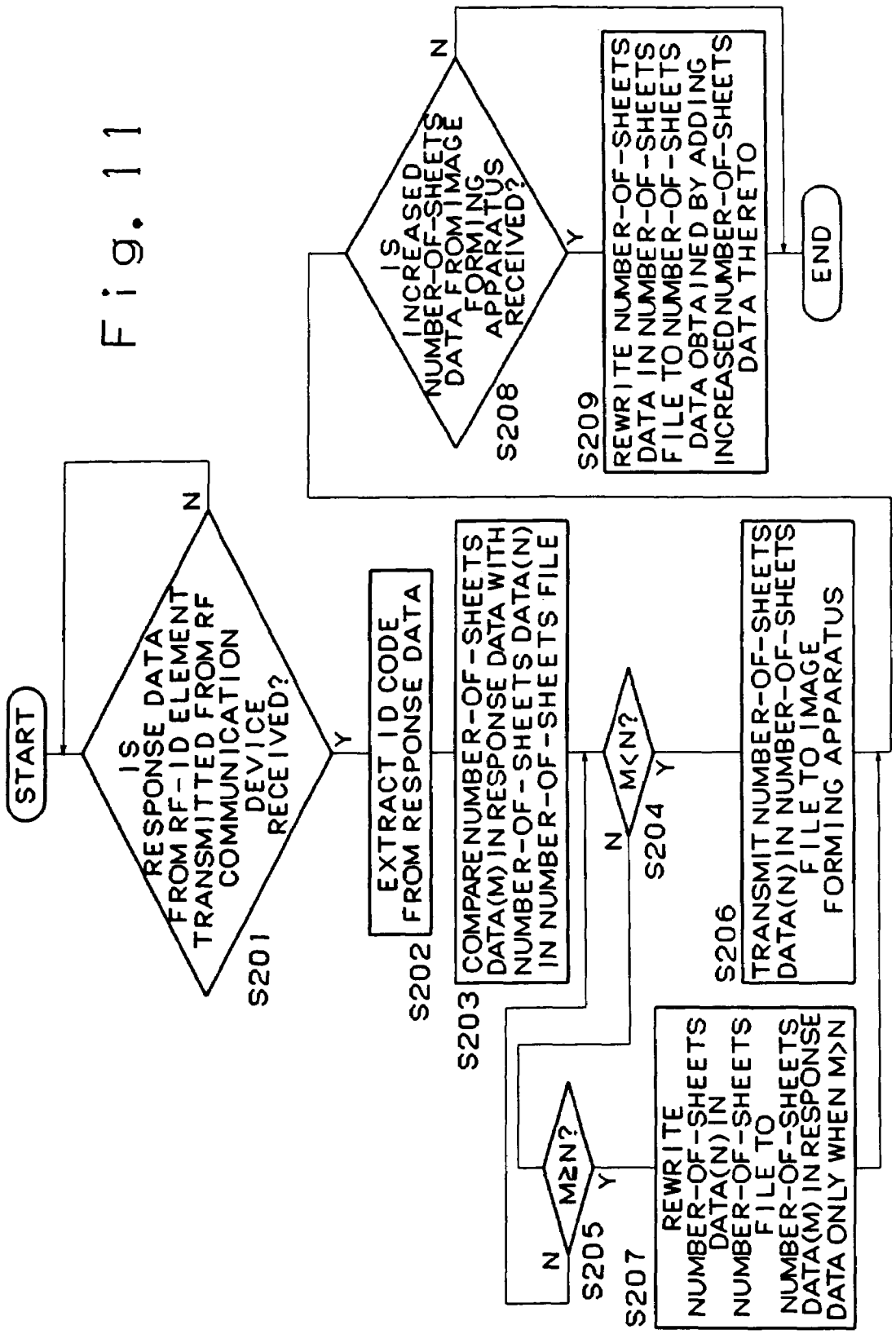

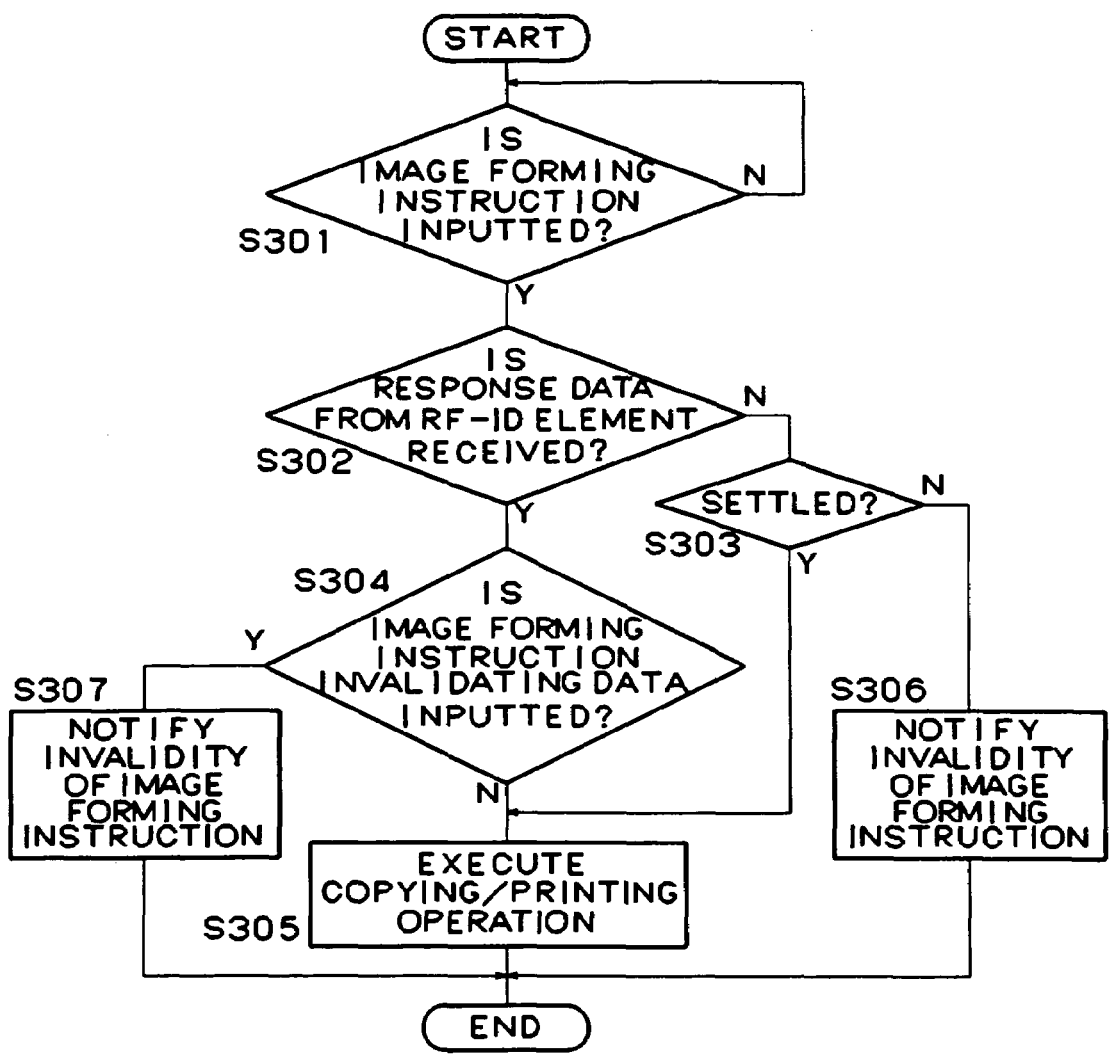

SYSTEM FOR MANAGING NUMBER OF SHEETS FOR IMAGE FORMATION

BACKGROUND OF THE INVENTION

1. Field of the Invention

The present invention relates to an image forming apparatus such as a copier, a printer or the like, which is capable of managing the number of sheets for image formation.

2. Description of the Related Art

As an image forming apparatus such as a copier, a printer or the like, one has heretofore been known wherein the number of sheets for image formation can be managed for each specific individual or post. For example, the image forming apparatus is provided with a key such as a key counter, a key card or the like inserted therein and attached thereto. When the image forming apparatus is in use, such a key is inserted into and attached thereto so that the operation thereof is allowed. In the case of the key counter, the number of sheets for image formation is set to the key counter itself. In the case of the key card, the number of sheets for image formation is stored in an image forming apparatus or computer to which a reader/writer of the key card is connected.

As the need for managing the number of sheets for image formation for each specific individual or post in the image forming apparatus, the adoption of such a system that each individual or post is charged with an amount corresponding to the number of sheets for image formation is considered. Namely, when one or more image forming apparatuses are used in a plurality of persons or a plurality of posts, respective individuals or posts might be billed according to the amount of their use. Such a case needs to manage the number of sheets for image formation in each image forming apparatus.

Problems of such a prior art will next be explained.

When one attempts to manage the number of sheets for image formation for each specific individual or post, a key counter or a key card is prepared and must be attached to each image forming apparatus. Since it is not realistic that one like the key counter is prepared for each individual in particular, the management of the number of sheets for image formation by the key counter should unavoidably be done in predetermined units such as every posts, etc. Having to take the trouble to prepare these key counter and key card even in the case of the key counter and the key card leads to cumbersomeness in itself. The fact that the key counter or key card must be mounted to the image forming apparatus, is also cumbersome in itself.

SUMMARY OF THE INVENTION

An object of the present invention is to allow the number of sheets for image formation to be managed without preparing a key counter, a key card, etc.

Another object of the present invention is to allow the number of sheets for image formation to be managed without special operation.

A further object of the present invention is to allow the number of sheets for image formation to be properly managed without preparing a key counter or a key card and without special operation.

According to the present invention as viewed from one aspect, an image forming apparatus for executing an image forming operation according to an image forming instruction issued from an image formation instructing device is provided, a RF communication device for counting the number of sheets for the formation of each image by the image forming apparatus and reading a personal ID code from a RF-ID element of a ID card incorporating therein the RF-ID element for storing at least the personal ID code is provided within the image formation instructing device, and a number-of-sheets file for storing therein the number of sheets for the formation of each image by the image forming apparatus for each ID code having predetermined bearing on the personal ID code is provided. Thus, when an image forming instruction is given to the image forming apparatus from the image formation instructing device while the RF communication device is reading the personal ID code, the counted number of sheets for image formation based on the image forming instruction is stored in the number-of-sheets file in association with each ID code having predetermined bearing on the personal ID code read by the RF communication device.

According to the present invention as viewed from another aspect, an image forming apparatus for executing an image forming operation according to an image forming instruction issued from an image formation instructing device is provided, a RF communication device for performing a RF communication with an ID card incorporating therein a RF-ID element for storing at least one personal ID code and the number of sheets for image formation to thereby read the personal ID code and the number of the sheets for image formation from the RF-ID element is provided within the image formation instructing device, and a number-of-sheets file for storing therein the number of sheets for the formation of each image by the image forming apparatus for each personal ID code is provided. Thus, when the RF communication device reads the personal ID code and the number of the sheets for image formation, the read number of sheets for image formation is compared with the number of sheets for image formation associated with the corresponding ID code, which is stored in the number-of-sheets file. Further, when the number of the sheets for image formation recorded in the number-of-sheets file is greater than the number of the sheets for image formation read by the RF communication device as a result of comparison thereof, the number of the sheets for image formation stored in the RF-ID element built in the ID card is updated to be the number of the sheets for image formation stored in the number-of-sheets file by using the RF communication device.

According to the present invention as viewed from a further aspect, an image forming apparatus for executing an image forming operation according to an image forming instruction issued from an image formation instructing device is provided, a RF communication device for performing a RF communication with an ID card incorporating therein a RF-ID element for storing at least one personal ID code and the number of sheets for image formation to thereby read the personal ID code and the number of the sheets for image formation from the RF-ID element is provided within the image formation instructing device, and a number-of-sheets file for storing the number of sheets for the formation of each image by the image forming apparatus for each personal ID code is provided. Thus, when the RF communication device reads the personal ID code and the number of the sheets for image formation, the read number of sheets for image formation is compared with the number of the sheets for image formation associated with the corresponding ID code, which is stored in the number-of-sheets file. Further, when the number of the sheets for image formation recorded in the number-of-sheets file is fewer than the number of the sheets for image formation read by the RF communication device as a result of comparison thereof, the number of the sheets for image formation recorded in the number-of-sheets file is updated to be the number of the sheets for image formation read by the RF communication device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 6 is a typical diagram illustrating a data structure of a number-of-sheets file (post file);

FIG. 9 is a schematic block diagram of the entire system showing another embodiment of the present invention;

FIG. 10 is a flowchart showing a process for counting the number of sheets for the formation of images by an image forming apparatus;

FIG. 11 is a flowchart illustrating a process performed by a host computer after having received response data from the image forming apparatus; and FIG. 12 is a flowchart showing a process performed by the image forming apparatus having received an image forming instruction.

DETAILED DESCRIPTION OF THE PREFERRED EMBODIMENTS

Figure 1:
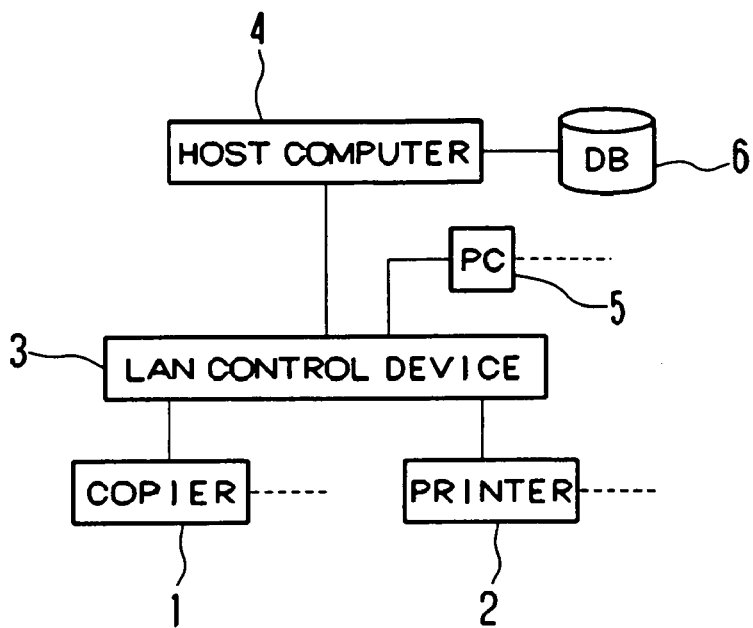
FIG. 1 is a schematic block diagram of the entire system showing an embodiment of the present invention.

Preferred embodiments of the present invention will next be described.

<Summary of Embodiment of the Present Invention>

An image forming system according to the present invention comprises, as one embodiment thereof, an image forming apparatus which executes an image forming operation in response to an image forming instruction issued from an image formation designating or instructing device, means for counting the number of sheets for the formation of images by the image forming apparatus, a RF communication device which is provided within the image formation instructing device and reads a personal ID code from an RF-ID device or element of an ID card having at least the RF-ID element for storing the personal ID code therein, a volume or number-of-sheets file which stores the number of sheets for the formation of images by the image forming apparatus for every ID codes each having predetermined bearing on the personal ID code, storing means for, when the image forming instruction is issued from the image formation instructing device to the image forming apparatus while the RF communication device is reading the personal ID code, allowing the number of sheets for the formation of images based on the image forming instruction counted by the counting means to correspond to the ID codes each having predetermined bearing on the personal ID code read by the RF communication device. Here, the RF-ID of the RF-ID element is short for "Radio Frequency Identification". Such a RF-ID is a system for identifying each individual or transmitting and receiving data by radio waves according to a combination of a small-sized recording medium (data carrier) and a reader/writer.

Thus, as an ID card holder approaches the image formation instructing device, a personal ID code stored in an RF-ID element built in the ID card is read by the RF communication device. When the image formation instructing device sends an image forming instruction to the image forming apparatus in this condition, an image forming operation is executed and the number of sheets for the formation of images is counted by the counting means. The counted number of sheets for the formation of the images is associated with ID codes each having predetermined bearing on the personal ID code read by the RF communication device and stored and held in the number-of-sheets file. Thus, the number of sheets for the formation of the images can be managed without preparing a key counter, a key card or the like. Further, the number of sheets for the formation of the images can be managed without special operation.

The image formation instructing device may be provided integrally with the image forming apparatus. In this case, the image formation instructing device is comprised of an image forming operation start switch or the like provided within the image forming apparatus. Even when the ID card holder gives an image forming instruction to the image forming apparatus, the number of sheets for the formation of images can be managed or controlled without preparing the key counter, the key card or the like. It is also possible to manage the number of sheets for the formation of the images without special operation.

The image formation instructing device may be placed in a position away separately from the image forming apparatus. In this case, the image formation instructing device is comprised of, for example, a personal computer LAN-connected to the image forming apparatus. Thus, when the ID card holder gives an image forming instruction to the image forming apparatus from the position away from the image forming apparatus, the number of sheets for the formation of images can be managed without preparing the key counter, the key card or the like. Further, the number of the sheets for the formation of the images can be managed without special operation.

Each ID code may be a code identical to the personal ID code. Thus, the number of sheets for the formation of images is held in the number-of-sheets file for each individual. The number of the sheets for the formation of the images can be stored in the number-of-sheets file.

The ID code may be an ID code indicative of a deposition or post to which each individual corresponding to the personal ID card belongs. Thus, the number of sheets for the formation of images is held in the number-of-sheets file for each post to which each individual corresponding to the personal ID code belongs. The number of sheets for the formation of images can be stored in the number-of-sheets file for each post to which each individual corresponding to the personal ID code belongs.

Amount calculating means for calculating an amount for each ID code on the basis of the number of the sheets for the formation of the images, which has been stored in the number-of-sheets file, can be further provided. Thus, the amount is calculated for each ID code, and billing information set for each ID code, for example, can be easily obtained.

The RF-ID element stores the number of sheets for the formation of the images by the image forming apparatus therein. The storing means may be constructed so that when the image forming instruction is given from the image formation instructing device to the image forming apparatus while the RF communication device is reading each personal ID code, the number of sheets for the formation of images, based on the image forming instruction counted by the counting means is added to the RF-ID element. Thus, information about the number of the sheets for the image formation is stored even in each ID card itself with the RF-ID element built therein. Accordingly, the number of the sheets for the image formation can be managed by reference to the information stored in the RF-ID element without preparing the key counter, the key card or the like. Further, the number of the sheets for the image formation can be managed without special operation.

There is provided a permit code storage area for storing in advance a permit code for permitting an image forming instruction issued from the image formation instructing device. When the RF-ID element stores a permit code therein and the operation for the image forming instruction is effected on the image formation instructing device, the image forming instruction may be rendered invalid when the RF communication device is reading each code unstored in the permit code storage area. Consequently, the image forming apparatus performs an image forming operation according to the image forming instruction issued from the image formation instructing device only where the RF communication device is reading each permit code stored in the permit code storage area. Thus, the system comprised principally of the RF-ID element can be allowed to have a function similar to the conventionally used key counter or key card.

When the RF communication device is reading each code unstored in the permit code storage area where the operation for the image forming instruction is effected on the image formation instructing device, the RF communication device may notify the contents thereof. The "notification" may include voice-based notification, display-based notification, etc. and is regardless of its type. Thus, it is possible to cause an operator to understand an attempt to carry out his or her incorrect operation. Further, an unauthorized use can be clearly demonstrated against a third party. In this case, the personal ID code can be used as the permit code. In this case, the personal ID code and the permit code can be shared, and the storage area of the RF-ID element can be effectively utilized.

There is provided a permit code storage area for storing in advance each permit code for permitting an image forming instruction issued from the image formation instructing device. When the RF-ID element stores the permit code therein and the operation for the image forming instruction is effected on the image formation instructing device, the image forming instruction may be rendered invalid when the RF communication device does not read any code. Consequently, the image forming apparatus performs an image forming operation according to the image forming instruction issued from the image formation instructing device only where the RF communication device is reading each permit code stored in the permit code storage area. Thus, the system comprised principally of the RF-ID element is allowed to have a function similar to the conventionally used key counter or key card.

When the RF communication device does not read any code where the operation for the image forming instruction is effected on the image formation instructing device, the RF communication device may notify such contents. The "notification" may include voice-based notification, display-based notification, etc. and is regardless of its type. Thus, it is possible to cause an operator to understand an attempt to carry out his or her incorrect operation. Further, an unauthorized use can be clearly demonstrated against a third party. When the personal ID code is used as the permit code in this case, the personal ID code and the permit code can be shared and the storage area of the RF-ID element can be effectively utilized.

A billing device for performing predetermined billing according to the operation of the image forming apparatus is further provided. When the RF communication device does not any code where the operation for the image forming instruction is effected on the image formation instructing device, the billing device is activated and thereby the image forming instruction may be rendered valid with settlement made by the billing device as a condition. Thus, if the settlement to be made by the billing device is given even if the RF communication device does not read any code, then the image forming apparatus performs the image forming operation according to the image forming instruction issued from the image formation instructing device. Accordingly, it is possible to cause users in a wider range to rightfully use the image forming apparatus.

<Specific Forms>

A more specific form of an embodiment according to the present invention will be explained with reference to FIGS. 1 through 8. FIG. 1 is a schematic block diagram of the entire system. In an image forming system according to the present embodiment, a plurality of copiers 1 each serving as an image forming apparatus and a plurality of printers 2 are respectively LAN-connected to a host computer 4 and a plurality of personal computers 5 through a LAN control device 3. Namely, the LAN control device 3 is comprised of a hub, a router, etc. and makes it possible to perform communications among the host computer 4, the personal computers 5, the copiers 1 and the printers 2. A data base 6 is constructed for the host computer 4.

Figure 2:
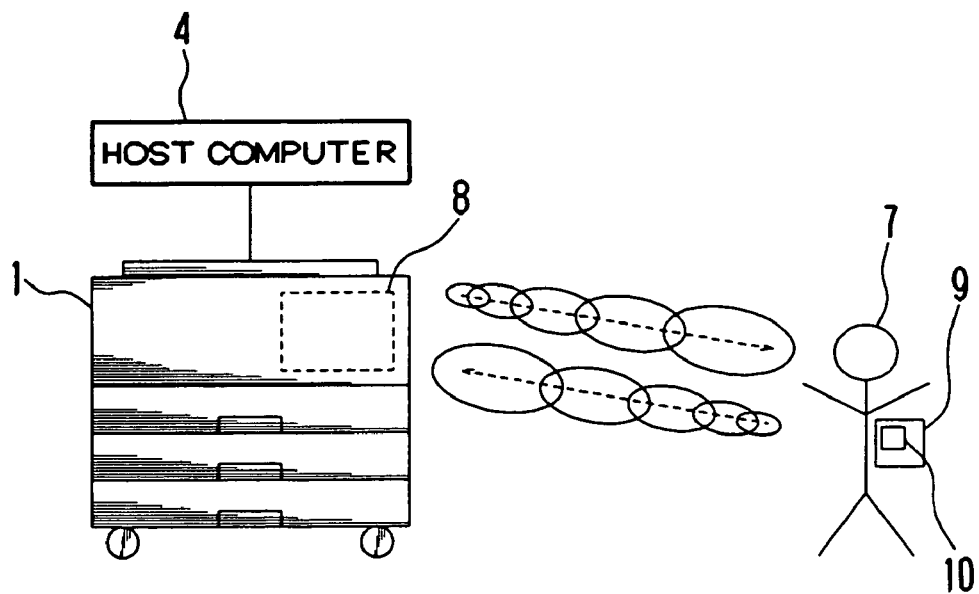
FIG. 2 is a typical diagram for describing the outline of a RF-ID system.

FIG. 2 is a typical diagram for describing the summary of a RF-ID system. The image forming system according to the present embodiment identifies each individual on the basis of RF-ID between the copiers 1 and printers 2 and their operators 7 and performs the transmission and reception of data therebetween. Since RF-ID is such a technique known per se as introduced even in, for example, Japanese Patent Application Laid-Open No. 10-273208 or the like, the description thereof will be omitted.

In the present embodiment, a RF communication device 8 is incorporated into each copier 1 LAN-connected to the host computer 4. The copier 1 is constructed in such a way as to communicate between a RF-ID device or element 10 built in a member certificate 9 used as an ID card put on each operator 7 and the RF communication device 8. Although not shown in the drawing, the RF communication device 8 is incorporated even in each printer 2. The printer 2 is constructed so as to perform communications between the RF-ID element 10 built in the member certificate 9 used as the ID card put on each operator 7 and the RF communication device 8.

Figure 3:
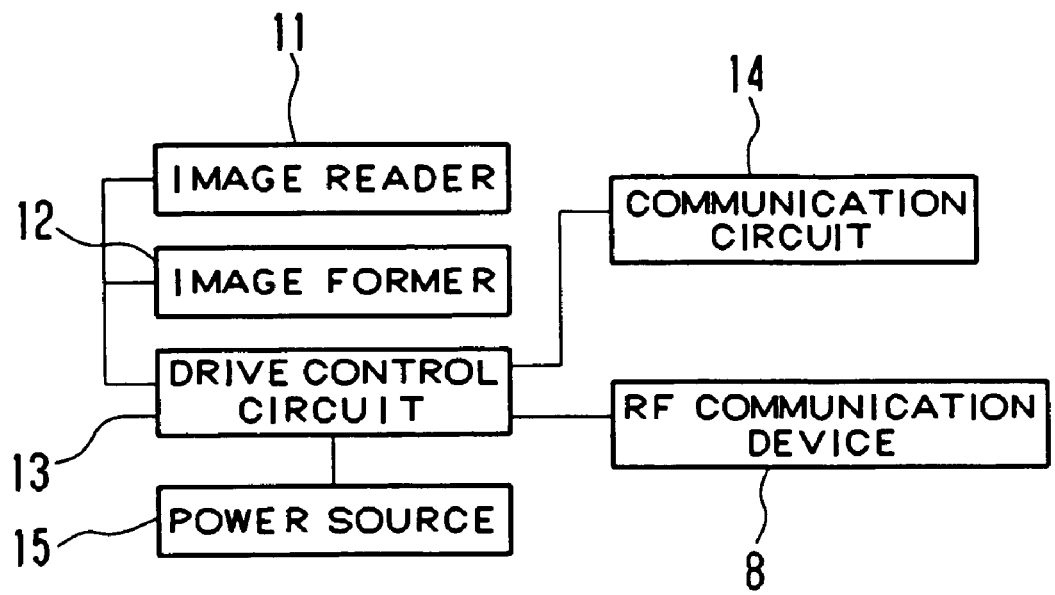
FIG. 3 is a schematic block diagram of an image forming apparatus (copier)

Namely, the copier 1 is provided with an image reader 11 and an image former 12 as shown in a schematic block diagram of the copier 1 shown in FIG. 3. Further, the copier 1 includes a drive control circuit 13 for driving and controlling these image reader 11 and image former 12. The drive control circuit 13 is comprised of a microcomputer and performs various control operations in accordance with operating programs stored in a ROM of the microcomputer. The drive control circuit 13 executes, for example, the operation of reading an image by the image reader 11, the operation of forming the read image by the image former 12, etc. Such image reading and forming operations are executed under the control of the microcomputer with the pressing down of an unillustrated start button of the copier 1 as trigger. Here, the functions of an unillustrated image formation instructing device are executed. However, the image forming operation may be constructed so as to start according to a command issued from the corresponding personal computer 5 or the like LAN-connected to the copier 1. In this case, a copy command and a print command employed in the personal computer 5 or the like are executed as the functions of the image formation instructing device. A communication circuit 14 for LAN and a RF communication device 8 are also connected to the drive control circuit 13. Incidentally, when the copy and print commands employed in the personal computer 5 or the like are executed as the functions of the image formation instructing device, the RF communication device 8 is built in or connected to the personal computer 5 and thereby disposed in the vicinity of the personal computer 5. Further, the respective parts 8, 11, 12, 13 and 14 employed in such a copier 1 are activated by being supplied with power from a power circuit 15.

While an example of the copier 1 is illustrated in FIG. 3 here, the printer 2 has substantially the same block configuration.

Figure 4:
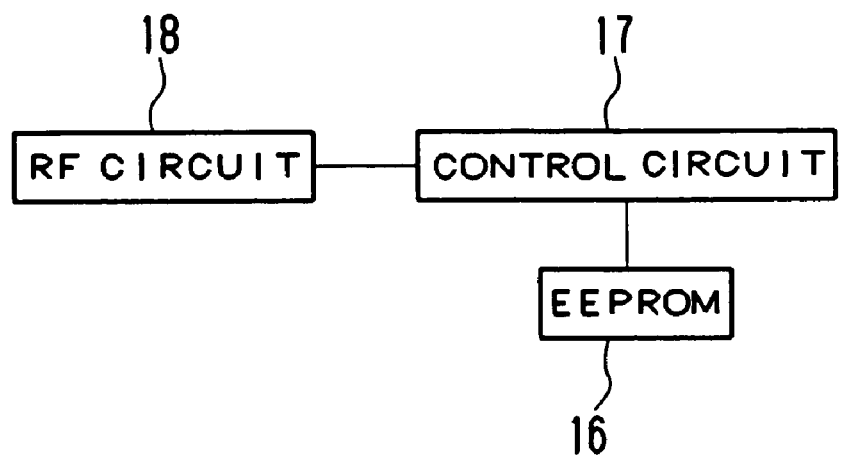
FIG. 4 is a schematic block diagram of a RF-ID element.

Next, as shown in a schematic block diagram of a RF-ID element 10 in FIG. 4, the RF-ID element 10 is constructed so that a RF circuit 18 is connected to a control circuit 17 to which an EEPROM 16 is connected. The RF circuit 18 is an analog circuit for implementing radio communications, and the control circuit 17 is a digital circuit for processing data transmitted and received through the RF circuit 18. Each personal ID code set to an owner of a member certificate 9 with the RF-ID element 10 built therein, and the number of sheets to be copied for each copier 1 and the number of sheets to be printed for each printer 2 are stored and held in the EEPROM 16.

Figure 5:
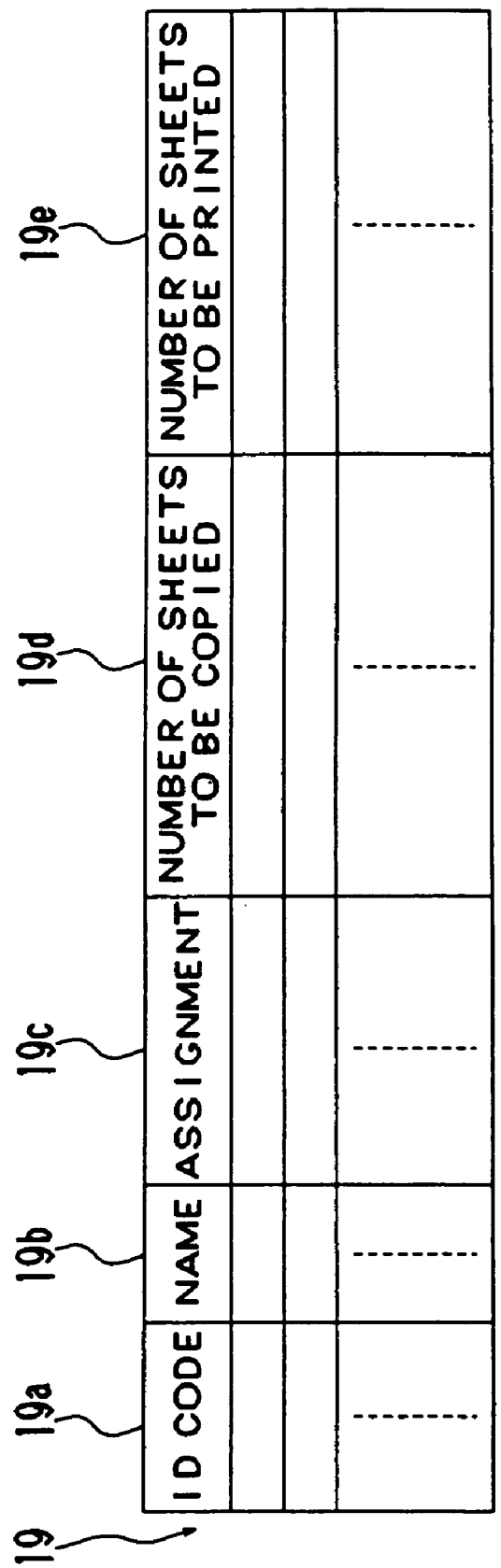
FIG. 5 is a typical diagram showing a data structure of a number-of-sheets file (personal file)

Here, the host computer 4 is provided with various file structures in its data base 6. FIG. 5 is a typical diagram showing a data structure of a personal file 19 defined as a number-of-sheets file, and FIG. 6 is a typical diagram illustrating a data structure of a post file 20 defined as a number-of-sheets file, respectively. The personal file 19 is provided with respective data storage areas for names 19b, positions or assignments 19c, the numbers of sheets to be copied 19d and the numbers of sheets to be printed 19e every ID codes 19a each corresponding to each personal ID code stored in the EEPROM 1. The numbers of the sheets to be copied 19d and the numbers of the sheets to be printed 19e are respectively areas for storing and holding the numbers of sheets to be copied and the numbers of sheets to be printed every ID codes for the copier 1 and printer 2. The post file 20 includes respective data storage areas for the numbers of sheets to be copied 20b, the numbers of sheets to be printed 20c, amount for copy 20c, amount for print 20e and total amounts 20f every post codes 20a defined as ID codes. Each post code 20a is a code corresponding to each assignment 19c in the personal file 19. Further, the number of the sheets to be copied 20b, the number of the sheets to be printed 20c, the amount for copy 20d and the amount for print 20e are respectively areas for storing and holding the number of the sheets to be copied, the number of the sheets to be printed, the amount for copy and the amount for print every ID codes for the copier 1 and the printer 2.

Figure 7:
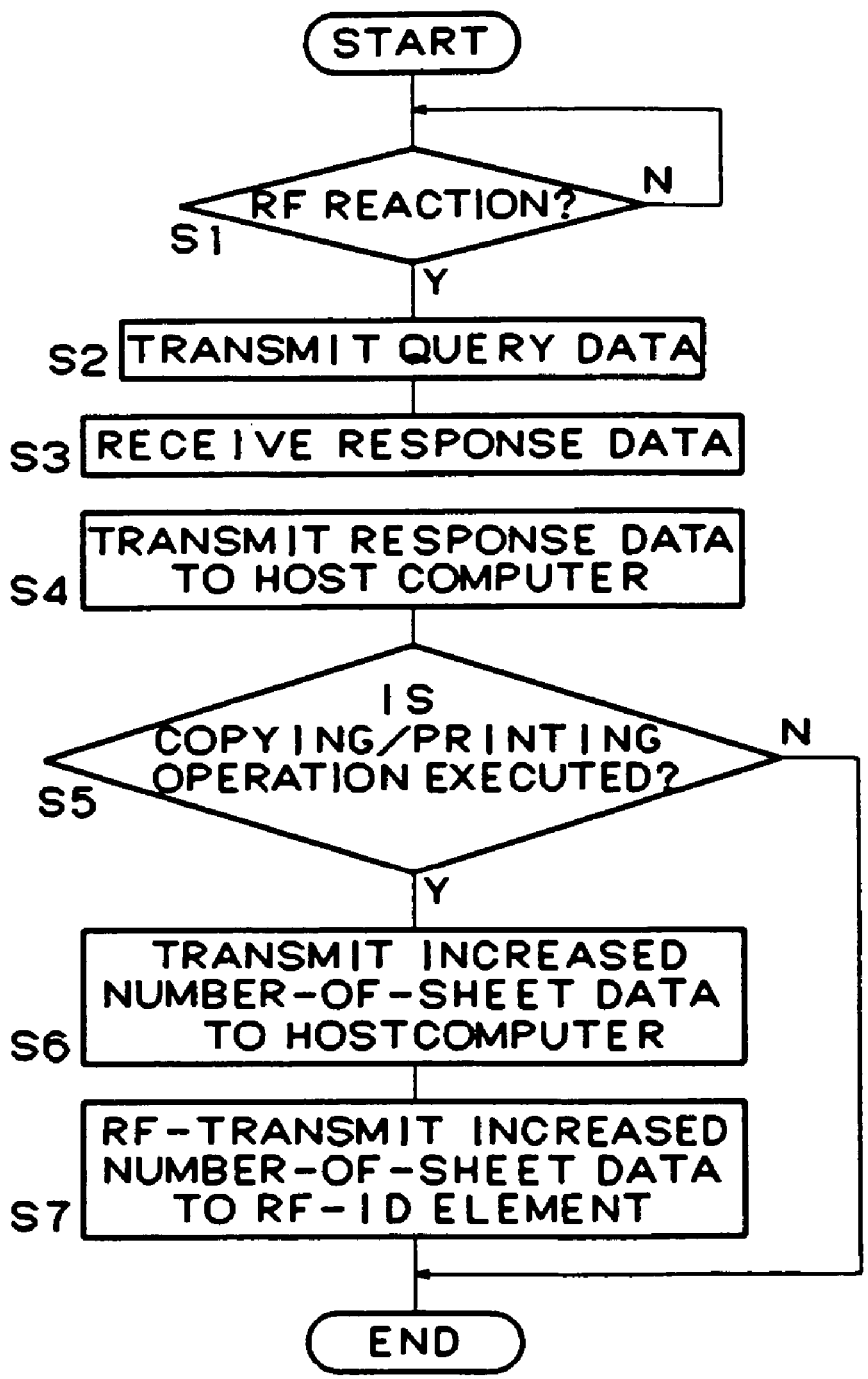
FIG. 7 is a flowchart showing a process for counting the number of sheets for the formation of images by the image forming apparatus.

Processes of such an image forming system at the time that the member or company staffer corresponding to the operator 7 approaches the copier 1 or the printer 2 with the intention of copying or printing, will be explained based on flowcharts shown in FIGS. 7 and 8. FIG. 7 is a flowchart showing a process for counting the number of sheets for image formation, which is employed in each of the copier 1 and printer 2. When the operator 7 corresponding to the company staffer with the member certificate 9 put thereon approaches the copier 1 or the printer 2, the RF communication device 8 lying within the copier 1 or printer 2 receives a radio signal sent from the RF circuit 18 placed within the RF-ID element 10 and hence the drive control circuit 13 lying within the copier 1 or printer 2 recognizes the presence of a RF reaction (Step S1). Thus, the copier 1 or printer 2 transmits query data through the RF communication device 8 by radio waves (Step S2). The contents of the query includes a query as to each personal ID code and a query about the numbers of sheets to be copied and printed. Correspondingly, the RF-ID element 10 lying within the member certificate 9 transmits each personal ID code and the numbers of the sheets to be copied and printed, which have been stored and held in the EEPROM 16, through the RF circuit 18 by radio waves. The numbers of the sheets to be copied and printed in this case are set every ID codes for the copier 1 and printer 2. The copier 1 and printer 2 respectively receive response data sent from such a RF-ID element 10 (Step S3) and transmits the response data to the host computer 4 via a LAN line (Step S4). It is thereafter determined whether copying and printing have been executed (Step S5). If it is determined that the copying and printing have been executed, then the numbers of sheets to be copied and printed are counted (counting means) and the counted increased number-of-sheets data is transmitted to the host computer 4 via the LAN line (Step S6). The number of sheets counted by the counting means is transmitted by radio waves through the RF communication device 8. The data about the counted number of sheets, which has been transmitted by radio waves in this way, is captured by the RF-ID element 10 through the RF circuit 18, so that the data stored in the EEPROM 16 is updated (Step S7). Namely, the number of the sheets to be copied or the number of the sheets to be printed for the corresponding copier 1 or printer 2, which has been stored in the EEPROM 16, is updated. Here, the function of the storing means is executed.

As other embodiment, the RF circuit 18 may store up the data itself about the counted number of sheets to be copied or the numbers of the sheets to be printed for the corresponding copier 1 or printer 2, which has been transmitted by radio waves, in the EEPROM 16. In this embodiment, total numbers of the sheets to be copied or the numbers of the sheets to be printed for the corresponding copier 1 or printer 2 can be easily obtained by adding all data about the counted number of sheets to be copied or the numbers of the sheets to be printed for the corresponding copier 1 or printer 2.

Figure 8:
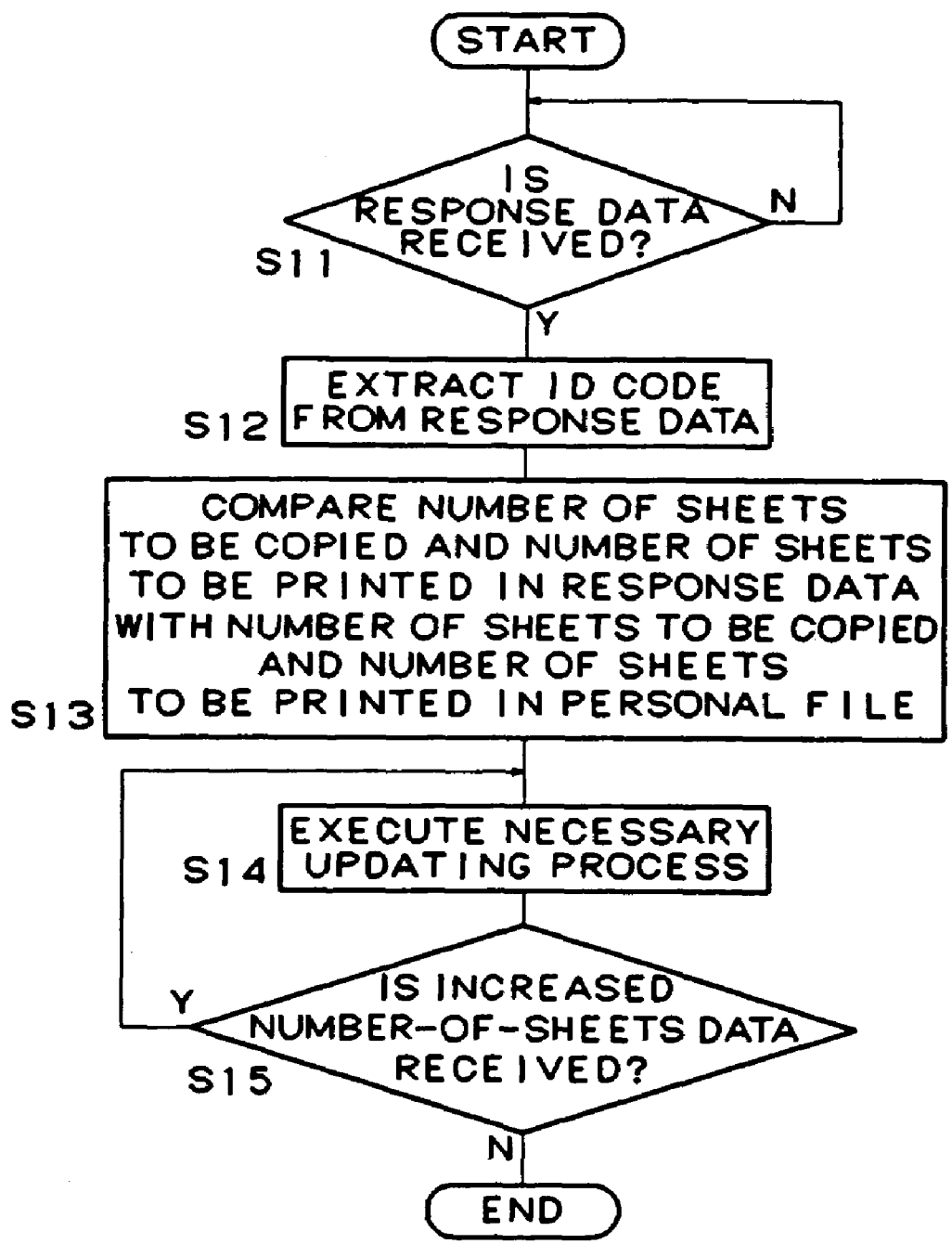
FIG. 8 is a flowchart illustrating a process performed by a host computer after having received response data from the image forming apparatus (copier)

FIG. 8 is a flowchart showing a process to be executed by the host computer after having received the response data from the copier 1 and the printer 2. When the response data transmitted from the copier 1 and printer 2 are received by the host computer 4 in Step S4 in the flowchart shown in FIG. 7 (Step S11), ID codes (corresponding to each individual ID codes in this case) are extracted from the response data (Step S12). Next, the corresponding ID code is retrieved from the personal file 19 illustrated in FIG. 5 by way of example. The number of sheets to be copied 19*d* and the number of sheets to be printed 19*e* both corresponding to the retrieved ID code are compared with the number of sheets to be copied and the number of sheets to be printed in the response data (Step S13). The comparison in this case is performed every ID codes with respect to both the copier 1 and the printer 2. Here, the function of comparing means is executed. If the resultant values do not coincide with each other as a result of its execution, then the number of the sheets to be copied 19*d* and the number of the sheets to be printed 19*e* in the personal file 19 are brought up to the number of the sheets to be copied and the number of the sheets to be printed in the response data, and the number sheets to be copied 20*b*, the number of sheets to be printed 20*c*, the amount for copy 20*d*, the amount for print 20*e* and the total amount 20*f* in each post file are also updated together (Step S14). Here, the number of the sheets to be copied 20*b* and the number of the sheets to be printed 20*c* corresponding to the corresponding post code 20*a* in the post file 20 are a collection or set of common items for the assignments 19*c* in the personal file 19. Further, the amount for copy 20*d*, the amount for print 20*e* and the total amount 20*f* are calculated by the host computer 4 based on the number of sheets to be copied 20*b* and the number of sheets to be printed 20*c* set for each post code 20*a*. In particular, the amount for copy 20*d* and the amount for print 20*e* are calculated for each copier 1 and each printer 2 with each ID code as a key. Here, the function of amount calculating means is executed.

Thereafter, when the increased number-of-sheets data transmitted from the copier 1 and the printer 2 are received by the host computer 4 in Step S6 in the flowchart of FIG. 7 (Step S15), the number of sheets to be copied 19*d* and the number of sheets to be printed 19*e* in each personal file 19 are updated according to the increased number-of-sheets data, and the number of sheets to be copied 20*b*, the number of sheets to be printed 20*c*, the amount for copy 20*d*, the amount for print 20*e* and the total amount 20*f* in each post file 20 are also updated together (Step S14). Here, the functions of the storing means and amount calculating means are executed.

Thus, according to the present embodiment, the number of sheets for image formation, such as the number of sheets to be copied, the number of sheets to be printed or the like can be finely managed without preparing the conventionally used key counter, key card, etc. and without special operation. It is also possible to easily obtain billing information.

Next, the number-of-sheets file 19 also serves as a permit code storage area. Namely, when the response data transmitted from the copier 1 and printer 2 are received by the host computer 4 in Step S4 in the flowchart shown in FIG. 7 (Step S11), ID codes (corresponding to each individual ID codes in this case) are extracted from the response data (Step S12). Next, the corresponding ID code is retrieved from the personal file 19 illustrated in FIG. 5 by way of example. If it is found at this time that the corresponding ID code cannot be retrieved from the personal file 19, then the host computer 4 feeds back information about its contents to the copier 1 or printer 2. As a result, the copier 1 or printer 2 to which the information about the inability to retrieve the ID code is returned, notifies its contents according to a process in the drive control circuit 13 thereof and prohibits a copy operation or print operation. In this sense, each personal ID code stored in the EEPROM 16 of the RF-ID element 10 functions even as a permit code. Namely, the personal ID code and the permit code are placed in a combined use and the storage capacity of the EEPROM 16 is effectively utilized. Incidentally, the notification thereof by the copier 1 or printer 2 includes an indication made by an unillustrated display, voice notification, etc. and is regardless of its type.

Here, the prohibition of the copy and print operations and their notification or notice are carried out even when the start buttons of the copier 1 and printer 2 are pressed in the state (N in Step S1) in which it is not determined in Step S1 of FIG. 7 that the RF reaction is present. Such processing is also performed according to processing to be carried out by the drive control circuit 13 in each of the copier 1 and printer 2. However, the present embodiment is provided with an unillustrated billing device wherein the amount for copy and the amount for print are calculated and settlement of their amounts in cash or by a credit card is accepted. The billing device may be constructed so as to allow the copy operation of the copier 1 or the print operation of the printer 2 even in the case of the state in which it is not determined in Step S1 of FIG. 7 that the RF reaction exists, on the condition that the settlement of the amounts in cash or by the credit card or the like has been made. The image forming system having such a configuration is so convenient under such a condition that in a library or the like, for example, a staff member having an ID card like a member certificate 9 and a visitor who does not hold such an ID card, share the use of the copier 1 and the printer 2 or the like.

Another embodiment of the present invention will next be described.

<Summary of Another Embodiment of the Present Invention>

In sum, the image forming system according to the aforementioned embodiment is a system wherein the RF-ID element for storing each personal ID card and the number of sheets for image formation therein is built in the ID card like the member certificate, for example, the number-of-sheets file for storing the number of the sheets for image formation therein is provided, the RF communication device is used to read the corresponding personal ID code from the RF-ID element built in the member certificate of the person who performs the operation for the image forming instruction, and the numbers of the sheets for image formation associated with the RF-ID element and the number-of-sheets file are updated every image forming operations. In such a system, the number of the sheets for image formation, which is stored in the RF-ID element, should coincide in principle with the number of the sheets for image formation, which is stored in the number-of-sheets file. However, when the person who has done the operation for the image forming instruction, is left for a place at which the communication range exceeds a RF-ID-based communication range, immediately after the execution of its operation, the number of the sheets for image formation stored in the RF-ID element is expected to become fewer than the number of the sheets for image formation stored in the number-of-sheets file. On the other hand, when a necessary updating process is not effected on the number-of-sheets file due to a system failure or the like, the number of the sheets for image formation stored in the RF-ID element is expected to become greater than the number of the sheets for image formation stored in the number-of-sheets file. There is a possibility that in either case, the number of the sheets for image formation stored in the RF-ID element will be mismatched with the number of the sheets for image formation stored in the number-of-sheets file due to any reason.

Therefore, another embodiment of the present invention can be constructed as an image forming system which comprises an image forming apparatus for executing an image forming operation according to an image forming instruction issued from an image formation instructing device, a RF communication device provided in the image formation instructing device and for performing a RF communication with an ID card having a RF-ID element built therein for storing at least each personal ID code and the number of sheets for image formation therein to thereby read the corresponding personal ID code and the number of sheets for image formation from the RF-ID element, a number-of-sheets file for storing the number of sheets for the formation of each image by the image forming apparatus for each personal ID code, comparing means for, when the RF communication device reads the personal ID code and the number of sheets for image formation, comparing the number of the sheets for image formation with the number of the sheets for image formation corresponding to the corresponding ID code, which has been stored in the number-of-sheets file, and first updating means for, when the number of the sheets for image formation recorded in the number-of-sheets file is greater than the number of the sheets for image formation read by the RF communication device as a result of the comparison by the comparing means, updating the number of the sheets for image formation in the RF-ID element built in the ID card to be the number of the sheets for image formation stored in the number-of-sheets file by using the RF communication device.

Thus, as an ID card holder approaches the image formation instructing device, each personal ID code and the number of sheets for image formation both stored in the RF-ID element built in the ID card are read by the RF communication device. Further, the read number of sheets for image formation is compared with the number of sheets for image formation corresponding to the corresponding ID code, which has been stored in the number-of-sheets file. When the number of the sheets for image formation recorded in the number-of-sheets file is greater than the number of the sheets for image formation read by the RF communication device as a result of its comparison, the RF communication device is used to update the number of the sheets for image formation in the RF-ID element built in the ID card to be the number of the sheets for image formation stored in the number-of-sheets file. Thus, the number of the sheets for image formation in the RF-ID element built in the ID card coincides with the number of the sheets for image formation stored in the number-of-sheets file. Namely, the number of the sheets for image formation in the RF-ID element built in the ID card can be matched with the number of the sheets for image formation stored in the number-of-sheets file so as to avoid a contradiction between the two.

A further embodiment can be constructed as an image forming system which comprises an image forming apparatus for executing an image forming operation according to an image forming instruction issued from an image formation instructing device, a RF communication device provided in the image formation instructing device and for performing a RF communication with an ID card having a RF-ID element built therein for storing at least each personal ID code and the number of sheets for image formation therein to thereby read the corresponding personal ID code and the number of sheets for image formation from the RF-ID element, a number-of-sheets file for storing the number of sheets for the formation of each image by the image forming apparatus for each personal ID code, comparing means for, when the RF communication device reads the personal ID code and the number of sheets for image formation, comparing the number of the sheets for image formation with the number of the sheets for image formation corresponding to the corresponding ID code, which has been stored in the number-of-sheets file, and second updating means for, when the number of the sheets for image formation recorded in the number-of-sheets file is fewer than the number of the sheets for image formation read by the RF communication device as a result of the comparison by the comparing means, updating the number of the sheets for image formation recorded in the number-of-sheets file to be the number of the sheets for image formation read by the RF communication device.

Thus, as an ID card holder approaches the image formation instructing device, each personal ID code and the number of sheets for image formation both stored in the RF-ID element built in the ID card are read by the RF communication device. Further, the read number of sheets for image formation is compared with the number of sheets for image formation corresponding to the corresponding ID code, which has been stored in the number-of-sheets file. When the number of the sheets for image formation recorded in the number-of-sheets file is fewer than the number of the sheets for image formation read by the RF communication device as a result of its comparison, the number of the sheets for image formation stored in the number-of-sheets file is updated to be the number of the sheets for image formation read by the RF communication device. Thus, the number of the sheets for image formation in the RF-ID element built in the ID card coincides with the number of the sheets for image formation stored in the number-of-sheets file. Namely, the number of the sheets for image formation in the RF-ID element built in the ID card can be matched with the number of the sheets for image formation stored in the number-of-sheets file so as to avoid a contradiction between the two.

The image formation instructing device may be provided integrally with the image forming apparatus. In this case, the image formation instructing device is comprised of an image forming operation start switch or the like provided within the image forming apparatus. Thus, even when the ID card holder gives an image forming instruction to the image forming apparatus, the number of the sheets for image formation in the RF-ID element built in the ID card and the number of the sheets for image formation stored in the number-of-sheets file are rendered coincident with each other, so that a contradiction between the two can be avoided. Further, the RF communication device may be provided integrally with the image forming apparatus. Consequently, the image forming apparatus can be singly provided with the functions of the image formation instructing device and the RF reader.

On the other hand, the image formation instructing device may be placed in a position away separately from the image forming apparatus. In this case, the image formation instructing device is comprised of, for example, a personal computer LAN-connected to the image forming apparatus. Thus, when the ID card holder gives an image forming instruction to the image forming apparatus from the position away from the image forming apparatus, the number of the sheets for image formation in the RF-ID element built in the ID card and the number of the sheets for image formation stored in the number-of-sheets file are matched with each other, whereby a contradiction between the two can be avoided.

There is also provided a permit code storage area for storing in advance a permit code for permitting an image forming instruction issued from the image formation instructing device. Further, when the operation for the image forming instruction is effected on the image formation instructing device, first image forming instruction invalidating means for invalidating the image forming instruction when the RF communication device is reading each code unstored in the permit code storage area, may be provided. Thus, since the image forming apparatus performs an image forming operation according to the image forming instruction issued from the image formation instructing device only where the RF communication device is reading each permit code stored in the permit code storage area, the system comprised principally of the RF-ID element can be allowed to have a function similar to the conventionally used key counter or key card.

When the RF communication device is reading each code unstored in the permit code storage area where the operation for the image forming instruction is effected on the image formation instructing device, first notifying means for notifying its contents may be provided. The "notification" may include voice-based notification, display-based notification, etc. and is regardless of its type. Thus, it is possible to cause an operator to understand an attempt to carry out his or her incorrect operation. Further, an unauthorized use can be clearly demonstrated against a third party. In this case, the permit code can be defined as each personal ID code. In this case, it is possible to share the use of the personal ID code and the permit code. Thus, the storage area of the RF-ID element can be effectively utilized.

There is also provided a permit code storage area for storing in advance each permit code for permitting an image forming instruction issued from the image formation instructing device. Further, when the RF communication device does not read any code when the operation for the image forming instruction is effected on the image formation instructing device, second image forming instruction invalidating means for invalidating the image forming instruction may be provided. Thus, the image forming apparatus performs an image forming operation according to the image forming instruction issued from the image formation instructing device only where the RF communication device is reading each permit code stored in the permit code storage area. Thus, the system comprised principally of the RF-ID element can be allowed to have a function similar to the conventionally used key counter or key card.

When the RF communication device does not read any code where the operation for the image forming instruction is effected on the image formation instructing device, second notifying means for notifying its contents may be provided. The "notification" may include voice-based notification, display-based notification, etc. and is regardless of its type. Thus, it is possible to cause an operator to understand an attempt to carry out his or her incorrect operation. Further, an unauthorized use can be clearly demonstrated against a third party.

A billing device for performing predetermined billing according to the operation of the image forming apparatus is further provided. When the RF communication device does not any code where the operation for the image forming instruction is effected on the image formation instructing device, the billing device is activated and thereby the image forming instruction may be rendered valid with settlement made by the billing device as a condition. Thus, if the settlement to be made by the billing device is given even if the RF communication device does not read any code, then the image forming apparatus performs the image forming operation according to the image forming instruction issued from the image formation instructing device. Thus, it is possible to cause users in a wider range to rightfully use the image forming apparatus.

<Specific Forms>

A more specific form of another embodiment according to the present invention will be explained with reference to FIGS. 9 through 12. Since an image forming system introduced as such another embodiment is identical in its hardware to the image forming system described above based on FIGS. 1 through 8, the description thereof will therefore be omitted. In the present embodiment, however, a billing device 1a is connected to each of copiers, and a billing device 2a is connected to each of printers. These billing devices 1a and 2a are devices for permitting the use of copiers 1 and/or printers 2 with the settlement in cash or by a credit card as a condition.

Processes of such an image forming system at the time that a member or company staffer corresponding to an operator 7 approaches the copier 1 or the printer 2 with the intention of copying or printing, will be explained based on flowcharts shown in FIGS. 10 through 12. FIG. 10 is a flowchart showing, for example, a process for counting the number of sheets for image formation, which is employed in each of the copier 1 and printer 2. When the operator 7 corresponding to the company staffer with a member certificate 9 put thereon approaches the copier 1 or the printer 2, a RF communication device 8 lying within the copier 1 or printer 2 receives a radio signal sent from a RF circuit 18 placed within a RF-ID element 10 and hence a drive control circuit 13 lying within the copier 1 or printer 2 recognizes the presence of a RF reaction (Step S101). Thus, the copier 1 or printer 2 transmits query data through the RF writing device 8 by radio waves (Step S102). The contents of the query includes a query as to each personal ID code and a query about the numbers of sheets to be copied and printed. Correspondingly, the RF-ID element 10 lying within the member certificate 9 transmits each personal ID code and the numbers of the sheets to be copied and printed, which have been stored and held in an EEPROM 16, through the RF circuit 18 by radio waves. The numbers of the sheets to be copied and printed in this case are set every ID codes for the copier 1 and printer 2. The copier 1 and printer 2 respectively receive response data sent from such a RF-ID element 10 (Step S103) and transmits the response data to a host computer 4 via a LAN line (Step S104).

FIG. 11 is a flowchart showing a process to be executed by the host computer after having received the response data from the copier 1 and the printer 2. When the response data (corresponding to personal ID codes and the numbers of sheets to be copied and printed) transmitted from the copier 1 and printer 2 are received by the host computer 4 in Step S104 in the flowchart shown in FIG. 10 (Step S201), ID codes (each corresponding to each personal ID code in this case) are extracted from the response data (Step S202). Although not demonstrated in the flowchart of FIG. 11 in this case, a LAN control device 3 is used when each ID code is not extracted and transmits image formation invalidating data to the copier 1 or printer 2 having transmitted the response data therefrom. On the other hand, the corresponding ID code is retrieved from the personal file 19 illustrated in FIG. 5 by way of example. The number of sheets to be copied 19d and the number of sheets to be printed 19e both corresponding to the retrieved ID code are compared with the number of sheets to be copied and the number of sheets to be printed in the response data (Step S203). The comparison in this case is performed every ID codes with respect to both the copier 1 and the printer 2. Here, the function of comparing means is executed.

The results of comparison are obtained as three kinds. Namely, the three types are as follows: one case in which the number of the sheets to be copied 19*d* and the number of the sheets to be printed 19*e* (number-of-sheets data N) in each personal file 19 corresponding to a number-of-sheets file are greater than the number of sheets to be copied/printed (number-of-sheets data M) in the response data (where the answer is found to be Y in Step S204), another case in which the number of the sheets to be copied 19*d* and the number of the sheets to be printed 19*e* (number-of-sheets data N) in each personal file 19 are fewer than the number of sheets to be copied/printed (number-of-sheets data M) in the response data (where the answer is found to be Y in Step S205), and a further case in which the number of sheets to be copied/printed (number-of-sheets data M) in the response data coincides with the number of the sheets to be copied 19*d* and the number of the sheets to be printed 19*e* (number-of-sheets data N) in each personal file 19 (where the answer is found to be Y in Step S205).

When the number of the sheets to be copied 19*d* and the number of the sheets to be printed 19*e* (N) in each personal file 19 are greater than the number of sheets to be copied/printed (M) in the response data (when the answer is found to be Y in Step S204), the LAN control device 3 is used to transmit the number of the sheets to be copied 19*d* and the number of the sheets to be printed 19*e* (number-of-sheets data N) in each personal file 19 corresponding to the number-of-sheets file to the copier 1 or printer 2 having transmitted the response data therefrom (Step S206). Here, the function of part of first updating means is executed.

When the number of the sheets to be copied 19*d* and the number of the sheets to be printed 19*e* (number-of-sheets data N) in the personal file 19 are fewer than the number of the sheets to be copied/printed (number-of-sheets data M) in the response data (when the answer is found to be Y in Step S205), a process for brining the number-of-sheets data N up to the number-of-sheets data M is executed (Step S207: second updating means). Namely, the number of the sheets to be copied 19*d* or the number of the sheets to be printed 19*e* is updated to be the number of sheets to be copied or the number of sheets to be printed in the RF-ID element 10. Further, the number of sheets to be copied 20*b*, the number of sheets to be printed 20*c*, an amount for copy 20*d*, an amount for print 20*e* and a total amount 20*f* in a post file 20 are also updated together (Step S207). Here, the number of the sheets to be copied 20*b* and the number of the sheets to be printed 20*c* corresponding to a post code 20*a* in the post file 20 are a collection or set of common items as to an assignment 19*c* in the personal file 19. The amount for copy 20*d*, the amount for print 20*e* and the total amount 20*f* are calculated based on the number of sheets 20*b* and the number of sheets to be printed 20*c* set for each post code 20*a* by the host computer 4. In particular, the amount for copy 20*d* and the amount for print 20*e* are calculated for each copier 1 and each printer 2 with an ID code as a key.

As shown in Step S105 in the flowchart shown in FIG. 10, the copier 1 and the printer 2 respectively determine the presence or absence of responses from the host computer 4. The responses in this case include the transmission of image formation invalidating data at the time that each ID code cannot be extracted in Step S202 of FIG. 11, the transmission of the number of the sheets to be copied 19*d* and the number of the sheets to be printed 19*e* (number-of-sheets data N) in the personal file, which is executed in Step S206 of FIG. 11, and the transmission of other instructions. When the transmission of the number of the sheets to be copied 19*d* and the number of the sheets to be printed 19*e* (number-of-sheets data N) in the personal file 19 is carried out (when the answer is found to be Y in Step S106), a process for updating the number of sheets to be copied or the number of sheets to be printed stored in the EEPROM 16 of the RF-ID element 10 to be the transmitted number-of-sheets data N is performed (Step S109). Here, the function of part of the first updating means is executed. When the transmission of the image formation invalidating data is carried out (when the answer is found to be Y in Step S107), image forming instruction invalidating data is produced and temporarily stored in a work area of a memory in the drive control circuit 13 of the copier 1 or printer 2 (Step S113). When the transmission of other instructions is performed (when the answer is found to be N in Step S107), a process for starting up a routine for processing the instructions is executed (Step S108).

Next, the copier 1 and the printer 2 respectively determine whether copying and printing have been executed (Step S110). If the copying and printing are found to have been executed (if the answer is found to be Y in Step S110), then the numbers of sheets therefor are counted and the counted increased number-of-sheet data is transmitted to the host computer 4 via the LAN line (Step S111). Further, the data is transmitted via the RF communication device by radio waves (Step S112). As shown in FIG. 11, the host computer 4 having received the increased number-of-sheets data therein (corresponding to Y in Step S208) performs a process for adding the increased number-of-sheets data to the number-of-sheets data N to perform data updating (Step S209). Namely, the increased number-of-sheets data is added to the number of the sheets to be copied 19*d* or the number of the sheets to be printed 19*e* in the personal file 19, and the number of sheets to be copied 20*b*, the number of sheets to be printed 20*c*, the amount for copy 20*d*, the amount for print 20*e* and the total amount 20*f* are updated together (Step S209). The counted number-of-sheets data transmitted by radio waves is captured by the RF-ID element 10 via the RF circuit 18 so that the data stored in the EEPROM 16 is updated. Namely, the number of the sheets to be copied by the corresponding copier 1 or the number of the sheets to be printed by the corresponding printer 2, each of which has been stored in the EEPROM 16, is updated.

According to the present embodiment as described above, the number of sheets for image formation, such as the number of sheets to be copied, the number of sheets to be printed or the like can be finely managed without preparing the conventionally used key counter, key card, etc. and without special operation. It is also possible to easily obtain billing information. Further, when the number of the sheets to be copied and the number of the sheets to be printed both stored in the RF-ID element 10 in each ID card 9 do not coincide with the numbers of the sheets to be copied 19*d* and 20*b* and the numbers of the sheets to be printed 19*e* and 20*c* in the personal file 19 and post file 20 each corresponding to the number-of-sheets file due to any reason, the first updating means and the second updating means resolve a mismatch between the number-of-sheets data. Thus, the accurate management of the number of sheets can be carried out.

FIG. 12 is a flowchart showing a process executed when an image forming instruction is inputted to a copier 1 or printer 2 from an unillustrated image formation instructing device. When the image forming instruction is inputted (when the answer is found to be Y in Step S301), the copier 1 or printer 2 first receives response data form the RF-ID element 10 (Y in Step S302) and executes a copying/printing operation (Step S305) on the condition that no image formation invalidating data exists (N in Step S304).

When no response data is now received from the RF-ID element 10 (when the answer is found to be N in Step S302), the drive control circuits 13 of the copier 1 and printer 2 determine the presence or absence of settlement by the billing devices 1*a* and 2*a* (Step S303). If the settlement is found to exist as a result of the determination thereof, then the copying/printing operation is allowed and executed (Step S305). On the other hand, if the settlement is found not to exist, then the process (Step S305) for the copying/printing operation is not executed and the invalidity of the image forming instruction is notified (Step S306). Here, the functions of second image forming instruction invalidating means and second notifying means are executed. The notification in this case may include an indication made by an unillustrated display, voice notification, etc. and is regardless of its type. The billing system like the present embodiment, using the billing devices 1*a* and 2*a* is so convenient under such a condition that in a library or the like, for example, a staff member having an ID card like a member certificate 9 and a visitor who does not hold such an ID card, share the use of the copier 1 and the printer 2 or the like.

When image forming instruction invalidating data is generated and temporarily stored in the work area in the memory of the drive control circuit 13 (when the answer is found to be Y in Step S304) even when the response data from the RF-ID element 10 is received (when the answer is found to be Y in Step S302), the process for the copying/printing operation (Step S305) is not performed and the invalidity of the image forming instruction is notified (Step S307). Here, the functions of first image forming instruction invalidating means and first notifying means are executed. The notification in this case may also include an indication made by an unillustrated display, voice notification, etc. and is regardless of its type. Here, the condition that the image forming instruction invalidating data is generated and temporarily stored in the work area in the memory of the drive control circuit 13, is set up when each personal ID code included in the response data cannot be retrieved from the corresponding ID code 19*a* in the personal file 19. This has already been explained in the description of Step S202 in FIG. 11, Steps S107 and S113 in FIG. 10, and these respective processes. In such respective processes, each personal ID code stored in the EEPRPOM 16 of the RF-ID element 10, and the ID code 19*a* stored in the personal file 19 used as the number-of-sheets file function even as permit codes respectively. Further, the personal file 19 functions even as a permit code storage area. Namely, the use of the personal ID code and the permit code is shared and the storage capacity of a memory area in each of the EEPROM 16 and the host computer 4 is effectively utilized.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Document Hei 11-105013 filed on Apr. 13, 1999 and Japanese Priority Document Hei 11-113089 filed on Apr. 21, 1999 the content of which are incorporated herein by reference.

The invention claimed is:

1. An image forming system, comprising:
   an image forming apparatus for executing an image forming operation according to an image forming instruction issued from an image formation instructing device;
   means for counting the number of sheets for the formation of an image by the image forming apparatus;
   a RF communication device provided within the image formation instructing device and configured to read a personal ID code from a RF-ID element of an ID card incorporating therein the RF-ID element for storing at least the personal ID code;
   a number-of-sheets file for storing therein the number of sheets for the formation of each image by the image forming apparatus for each ID code having predetermined bearing on the personal ID code; and
   means for, when an image forming instruction is given to the image forming apparatus from the image formation instructing device while the RF communication device is reading the personal ID code, storing the number of sheets for image formation based on the image forming instruction, which is counted by the counting means, in the number-of-sheets file in association with each ID code having predetermined bearing on the personal ID code read by the RF communication device,
   wherein a permit code storage area for storing in advance a permit code for allowing the image forming instruction issued from the image formation instructing device is provided, and the RF-ID element stores the permit code therein and invalidates the image forming instruction when the RF communication device is reading each code unstored in the permit code storage area where the operation for the image forming is effected on the image formation instruction device.

2. The image forming system according to claim 1, wherein the image formation instructing device is provided integrally with the image forming apparatus.

3. The image forming system according to claim 1, wherein the image formation instructing device is placed in a position away separately from the image forming apparatus.

4. The image forming system according to claim 1, wherein the ID code is a code identical to the personal ID code.

5. The image forming system according to claim 1, wherein the ID code is and ID code indicative of a post to which each individual corresponding to the personal ID code belongs.

6. The image imaging system according to claim 1, wherein the RF-ID element stores therein the number of the sheets for the formation of each image by the image forming apparatus, and when an image forming instruction is given to the image forming apparatus from the image formation instructing device while the RF communication device is reading the personal ID code, the storing means adds the number of sheets for image formation based on the image forming instruction, which is counted by the counting means, to the RF-ID element.

7. The image forming system according to claim 1, wherein when the RF communication device is reading each code unstored in the permit code storage area where the operation for the image forming instruction is effected on the image formation instructing device, the RF communication device notifies the contents thereof therefrom.

8. The image forming system according to claim 1, wherein the permit code is the personal ID code.

9. The image forming system according to claim 1, wherein the RF-ID element invalidates the image forming instruction when the RF communication device does not read any code where the operation for the image forming instruction is effected on the image formation instructing device.

10. The image forming system according to claim 9, wherein when the RF communication device does not read any code where the operation for the image forming instruction is effected on the image formation instructing device, the RF communication device notifies the contents thereof therefrom.

11. The image forming system according to claim 9, wherein the permit code is the personal ID code.

12. The image forming system according to claim 9, further including a billing device for performing predetermined billing according to the operation of the image forming apparatus, and wherein when the RF communication device does not read any code where the operation for the image forming instruction is effected on the image formation instructing device, the billing device is activated to validate the image forming instruction on the condition that settlement is carried out by the billing device.

* * * * *